May 27, 1947.     R. H. HIGBY     2,421,062
METHODS FOR RECOVERY OF NARINGIN
Filed March 11, 1944
1. NARINGIN CONTAINING SOURCE MATERIAL — AS GRAPEFRUIT PULP
2. FIRM OR HARDEN — AS WITH LIME
3. ALKALINE EXTRACTION — AS AT pH 7.5 TO 9.5
4. LIQUOR REMOVAL — AS BY PRESSING
5. LOWER pH OF LIQUOR — AS WITH HCl
6. CRYSTALLIZATION
7. SEPARATION OF CRYSTALS
8. RECRYSTALLIZATION — IF DESIRED
INVENTOR
RALPH H. HIGBY
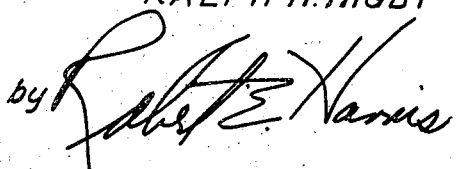
ATTORNEY Patented May 27, 1947

2,421,062

UNITED STATES PATENT OFFICE 2,421,062

METHOD FOR RECOVERY OF NARINGIN

Ralph H. Higby, Ontario, Calif., assignor to California Fruit Growers Exchange, Los Angeles, Calif., a corporation of California Application March 11, 1944, Serial No. 526,088

9 Claims. (Cl. 260—210)

This invention relates to a new and useful process for the recovery of naringin from plant source material.

An object of this invention is improvement in the recovery of naringin from its source materials, e. g., citrus fruits. It involves alkaline extraction of the naringin from its source materials.

Further objects and advantages will appear more fully to those skilled in the art from a consideration of the invention as set forth in the following description and in the appended claims.

The drawing is a flow sheet containing an illustrative showing of my preferred process.

In carrying out my process with, for example, on grapefruit, the grapefruits are first preferably treated to remove the juice therefrom, or the juice portion of the fruit may be removed entirely. The juice may be removed by reaming from the fruit or by passing the whole fruit through a pulping machine or a suitable press. In processes where the grapefruit hearts are to be canned as such, the peel will be removed from the juice ball. This operation is often performed commercially by hand.

If the peel is separated in large pieces from the juice portion, the peel should now preferably be disintegrated to such an extent as to be of uniformly small particle size so as to permit convenient access by the reagent. I have found that if the peel is passed through a press of the food chopper variety in which the face plate has openings of about ⅜ inch in diameter, the peel particles will be satisfactory for my purpose. It should be understood that as much of the rag and interior pulp as may be desired may be included with the peel in my naringin recovery process. The particular manner in which the peel and pulp is comminuted is of significant importance only insofar as it may effect the access of reagents to the pulp and the ease with which the mass is handled through various types of equipment.

This produces a representative source material indicated in 1 on the drawing. This pulp is then suspended in a quantity of water to which lime has preferably been previously added. In carrying out step 2 of the process, I have found it desirable to use a tank of suitable capacity, as for example 500 gallons, and one equipped with an agitator. In this tank are placed approximately 200 gallons of water to which I add about 10 pounds of slaked lime. This is sufficient water to suspend approximately one ton of the chopped grapefruit pulp, which is agitated therein for approximately 15 minutes, after which there is added, as indicated at 3, a 25% caustic soda solution, if required, until the pH value of the liquor reaches and remains within a pH range from about pH 8.4 to about pH 9.1. This suspension or slurry is preferably agitated for a further period of time, usually about 30 minutes, in order to give the best extraction and is then subjected to a pressing operation, indicated at 4, for the purpose of separating the liquor containing the naringin from the pulp.

The liquor containing the naringin in solution is then, as indicated at 5, adjusted by means of hydrochloric acid to a pH of approximately 4 to 5. At this pH the naringin will be precipitated readily from the solution. This precipitation or crystallization is shown on the drawing at 6.

The separation of the crystals indicated at 7, may be accomplished in any desired manner. The margin recovered by the process described above will contain some impurities and, if desired, it may be subjected to known recrystallization steps, indicated at 8.

Naringin is a natural glycoside having the emperical formula $C_{27}H_{32}O_{14}$. One of the most prolific sources is the peel and rag of the grapefruit. It is also reported to occur in relatively large quantities in the leaves. This glycoside seems so far only to have been reported as obtained from the grapefruit, which is variously identified as *Citrus grandis*, Osbeck, and *Citrus decumana*, Linn. (The Standard Cyclopedia of Horticulture, by L. H. Bailey, The MacMillan Company, 1935) and identified as derived from *Citrus maxima* (Webster's New International Dictionary, second edition). One recent worker has reported naringin as appearing in Indian Shaddock, which is apparently a clearly distinguished variety of *Citrus maxima* (Webster's New International Dictionary, second edition).

Several methods are known for the extraction of naringin from its source material. One such method depends upon the much greater solubility of the naringin in hot water than in cold. This method consists essentially of boiling up the grapefruit pulp with water, followed by straining and cooling. Manifestly this method is capable of introducing considerable quantities of impurities, and creates conditions which hinder crystallization of the naringin. My process produces a very much more satisfactory yield commercially and a product which is freer of impurities.

I prefer, as an ordinary commercial embodiment, to use lime, i. e. calcium hydroxide, for the hardening step for reasons of convenience and economy. But it should be noted that any alkaline earth compound which will give sufficient cations in the aqueous medium will function to harden the pulp satisfactorily. Barium hydroxide and strontium hydroxide are chemically effective. Whether they will desirably be utilized will depend upon the subsequent use, if any, to which it is intended to put the residual pulp.

While magnesium acts in some respects as an alkaline earth, it has been forcefully argued that it should not be considered as belonging to the alkaline earth group. Notwithstanding, I have found that, for example, $Mg(OH)_2$ or $MgCO_3$ may first be used to harden the peel, and the solubilization and extraction of the naringin may then be effected by adding any appropriate alkaline reagent to obtain the desired pH of extraction. It therefore follows that for the purpose of this process, magnesium may be considered as an alkaline earth at the hardening step, but it is not preferred for use in the extraction step. While it is possible with $Mg(OH)_2$ to alkalinize into the lower portion of the operative extraction range, uneconomical quantities of reagent are required.

In step 3 of the above description, I have given as an example the use of caustic soda for the purpose of adjusting the pH to within the range from about 8.4 to about 9.1. However, it is to be understood that any alkali-acting substance which is capable of effecting such a pH and which will solubilize the naringin, i. e. form soluble compounds of naringin, may be used for this purpose. Examples of commercially convenient substances are potassium hydroxide, ammonium hydroxide, sodium carbonate, calcium hydroxide, etc. While these alkali-acting substances form compounds with naringin which are often referred to as salts, they are more precisely called phenolates. The formation of these appears to occur over the range from about pH 7.5 to about pH 9.5. Higher pH values or, more precisely, more exposure to alkaline action, while it removes the naringin from the source material, produces a liquor from which it is difficult if not impossible to recover the naringin as such. It may be presumed that this result is due to some modification of the structure from which the naringin does not revert to its original structure upon acidification.

In the examples given above I have indicated that the desired pH range within which the solubilization and extraction of the naringin may be effected, lies in the range from about pH 8.4 to about pH 9.1 at equilibrium. However, this extraction step may be carried out with reasonably satisfactory results in the broader pH range indicated above, namely from about pH 7.5 to about pH 9.5. In one grouping of extraction tests in which yield in pounds per ton was plotted against extraction pH at equilibrium, the rising curve was found to indicate a yield of about two pounds of naringin per ton of pulp being treated at about pH 7.5, and the falling curve was back down to about two pounds per ton at about pH 9.5. This same curve crossed the three pounds per ton line at about pH 8.4 and again at about pH 9.1, while the region between these two latter points was indicated as yielding slightly more than three pounds per ton. It should be understood that these yields are considered to be abnormally low since the tests were run upon quite mature fruit—fruit which might well be described as aged. On fresh, prime fruit, yields in the neighborhood of twice those above would be expected. However, the results as to pH are considered as representative of good commercial practice. The tests also indicate that the pH values given above are those which give the results indicated when the pulp going through the treating process encounters the usual time lag consequent upon handling large volumes of material, particularly in batch processes or processes which have some batch steps. Laboratory results indicate that with rapid handling, considerably higher pH values may be employed. Alkalinities up to as high as pH 11 will apparently operate without any serious alkaline degradation effects upon the naringin if the time of exposure at this pH condition is kept down to a matter of a few minutes.

I have found that ammonium hydroxide is very convenient for use in the extraction since, after the extraction has taken place, the alkalinity of the material may be reduced by merely subjecting the solution to aeration or to reduced pressure to remove the ammonia. This variation of the process is not only convenient to employ, but is also economical in that considerably less acid is required for the subsequent neutralization which effects the precipitation of naringin.

Performance of the extraction step with alkali-acting substances which form soluble pectic compounds without having first performed the firming or hardening step will result in the recovery of pectic material with the crude naringin.

While I have mentioned hydrochloric acid as being satisfactory for use in adjusting the pH of the liquid to within the range of about pH 4 to about pH 5 for purposes of crystallization, many mineral or organic acids may be used for this adjustment, for example, sulphuric acid, nitric acid, citric acid, acetic acid, carbonic acid, etc. Where the extraction at step 3 has been performed with such a reagent or under such conditions that there is present in the liquor removed at step 4 any appreciable quantity of alkaline earth, the acidifying step 5 will ordinarily be performed with an acid which will yield a soluble alkaline earth salt, so as not to cause at this stage an alkaline earth precipitate which would introduce a filtration step or a recrystallization step into the procedure. Where ammonia has been used as the extraction agent, heat or aeration will go far towards completing the lowering of the pH of the liquor, indicated at 5.

While the desired pH range for crystallization has been indicated as lying within the range of about pH 4 to about pH 5, it is desired to point out that crystallization apparently will occur to some extent beginning at about pH 7 and increasing to a moderately satisfactory rate at about pH 6. The acidification should not be carried to such a point as to cause destruction or breakdown of the naringin and for this purpose I prefer not to go below about pH 2.5.

Furthermore, in the above examples I have mentioned the use of only one extraction of the source material. It is obvious, however, that repeated extractions may be carried out on the source material in a manner well known to those skilled in the art. Furthermore, I have found that additional amounts of naringin may be recovered by washing the extracted source material with water after the first extraction and then using this wash water to make up subsequent batches of fresh peel for extraction purposes.

Having thus described my invention in such full, clear, concise, and exact language as to enable others skilled in the art to make and use the same, I claim as my invention and desire to secure by Letters Patent the following:

1. A method for the recovery of naringin which comprises the steps of adding to plant material containing naringin, lime in amount sufficient to coagulate the slimy components of the plant material, adding caustic soda to said lime treated material in amount sufficient to increase the alkalinity of an aqueous suspension of said plant material to within the range from about pH 8.4 to about pH 9.1, allowing the mixture to remain for a time sufficient to solubilize the naringin, recovering a liquor containing naringin from said material, adjusting the pH of the liquor to within a range of about pH 4 to about pH 5 by means of hydrochloric acid and subsequently allowing the naringin to crystallize therefrom.

2. A method for the recovery of naringin which comprises the steps of adding to plant material containing naringin, lime in amount sufficient to coagulate the slimy components of the plant material, adjusting the alkalinity of an aqueous suspension of said plant material to within the range from about pH 8.4 to about pH 9.1 allowing the mixture to remain for a time sufficient to solubilize the naringin, recovering a liquor containing a naringin from said material, adjusting the pH of the liquor to within a range of about pH 4 to about pH 5 and subsequently allowing the naringin to crystallize therefrom.

3. A method for the recovery of naringin from plant material containing same which comprises the steps of treating the plant material to coagulate slimy components thereof and adjusting the pH of an aqueous suspension of the material to within the range from about pH 7.5 to about pH 9.5 to promote the formation of soluble compounds of naringin, allowing the mixture to remain for a time sufficient to permit the formation of substantial amounts of such compounds, recovering a liquor containing naringin from said material, adjusting the pH of the liquor to between about pH 7 and the pH below which a substantial proportion of the naringin is destroyed, and subsequently allowing naringin to crystallize from the liquor.

4. A method for the recovery of naringin from material containing the same which comprises the steps of adjusting the pH of an aqueous suspension of the material to within a range from about pH 8.4 to about pH 9.1, allowing the material to remain for a time sufficient to permit the formation of substantial amounts of soluble naringin compounds, recovering liquor containing naringin from said material, adjusting its pH to between about pH 6 and about pH 2.5, and allowing naringin to crystallize therefrom.

5. A method of recovering naringin from citrus source materials which comprises hardening the citrus source material with alkaline earth compound, treating the citrus source material with sufficient of an aqueous, alkaline ammonia compound to give a pH above about 7.5 to solubilize the naringin, removing liquor containing the solubilized naringin, reducing the pH of the liquor to between about pH 7 and the pH below which a substantial proportion of the naringin is destroyed, precipitating the naringin and separating the precipitated naringin therefrom.

6. A method of recovering naringin from citrus source materials which comprises hardening the citrus source material with alkaline earth compound, adjusting the pH of an aqueous medium containing the material with an alkaline ammonia compound to within the range from about pH 7.5 to about pH 9.5 to solubilize the naringin, removing liquor containing the solubilized naringin, reducing the pH of the liquor to between about pH 7 and about pH 2.5 to precipitate the naringin and separating the precipitated naringin therefrom.

7. A method of recovering naringin from citrus source materials which comprises hardening the citrus source material with alkaline earth compound, adjusting the pH of an aqueous medium containing the material with an alkaline ammonia compound to within the range from about pH 8.4 to about pH 9.1 to solubilize the naringin, removing liquor containing the solubilized naringin, reducing the pH of the liquor to between about pH 6 and about pH 2.5 to precipitate the naringin and separating the precipitated naringin therefrom.

8. A method of recovering naturally occurring naringin from citrus material which comprises treating an aqueous suspension of the material with an alkaline ammonia compound to increase the pH to within the range of about pH 8.4 to about pH 9.1 to solubilize the naringin, removing the liquor containing the solubilized naringin, reducing the pH of the liquor to between about pH 7 and about pH 2.5 to precipitate the naringin and separating the precipitated material from the liquor.

9. A method for the recovery of naringin from plant material containing the same which comprises the steps of adjusting the pH of an aqueous suspension containing the material to above about pH 7.5, allowing the mixture to remain for a time sufficient to permit the formation of substantial amounts of soluble naringin compounds, recovering liquor containing naringin from said material, adjusting the pH of the liquor to between about pH 7 and about pH 2.5, and allowing naringin to crystallize therefrom.

RALPH H. HIGBY.

REFERENCES CITED

The following references are of record in the file of this patent:

UNITED STATES PATENTS

| Number | Name | Date |
| --- | --- | --- |
| 2,348,215 | Higby | May 9, 1944 |